July 3, 1951     J. T. PEMBERTON     2,559,169
ARTIFICIAL FISH LURE
Filed May 11, 1948     2 Sheets-Sheet 1
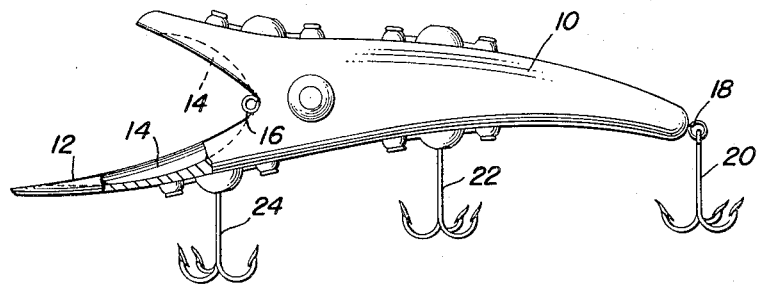
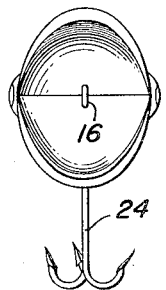
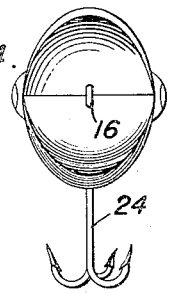
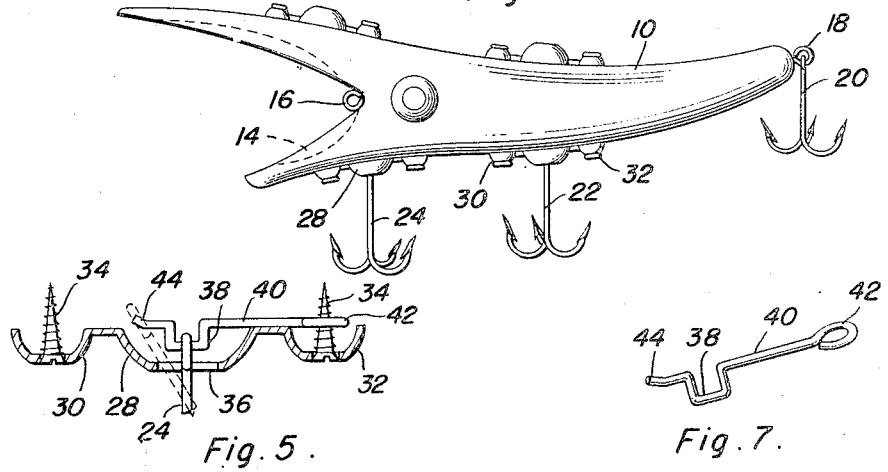
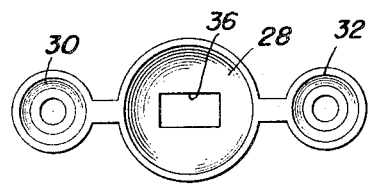
John T. Pemberton
INVENTOR.
BY *Clarence A. O'Brien and Harvey B. Jacobson*
Attorneys July 3, 1951 — J. T. PEMBERTON — 2,559,169
ARTIFICIAL FISH LURE
Filed May 11, 1948 — 2 Sheets-Sheet 2

John T. Pemberton
INVENTOR.

BY Clarence A. O'Brien
and Harvey B. Jackson
Attorneys

Patented July 3, 1951

2,559,169

UNITED STATES PATENT OFFICE 2,559,169

ARTIFICIAL FISH LURE

John T. Pemberton, Oklahoma City, Okla.

Application May 11, 1948, Serial No. 26,452

1 Claim. (Cl. 43—42.44)

This invention appertains to novel and useful improvements in fishing appurtenances.

An object of this invention is to provide a fish lure body with improved means for detachably securing a hook thereto, said means including a dome-shaped slotted housing having extensions with apertured domes arranged to receive fastening elements, for example screws, to hold the housing and its extension in place on a fish lure body, together with a key located between the body and the housing so that a fishhook eye may be passed through the slot in the housing and locked in the key.

Ancillary objects and features of novelty will become apparent to those skilled in the art, in following the description of the preferred form of the invention, illustrated in the accompanying drawings, wherein:

Figure 1 is an elevational side view of one form of lure employing the invention;

Figure 2 is a front view of the lure shown in Figure 1;

Figure 3 is an elevational view of a second form of lure employing the invention;

Figure 4 is a front view of the lure shown in Figure 3;

Figure 5 is a sectional view of the preferred housing construction utilized in association with the invention and forming a portion thereof;

Figure 6 is a plan view of the housing forming a portion of the fishhook clamping means;

Figure 7 is a perspective view of a key utilized in association with the clamping means;

Figure 8:
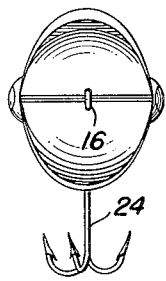
Figure 8 is a front view of another form of lure employing the invention.

This invention consists primarily of an improved means to attach a fishhook to one or a plurality of modified forms of fish lure bodies. It will be understood that variations may be made in the fish lures and particularly the bodies thereof for various types of fishing.

Referring to Figure 1, there is indicated a body 10 which may be made of any suitable material such as plastic, wood, corks, or any other feasible material. In the event that non-buoyant material is utilized the body 10 may be hollow, if it is found desirable.

The said body 10 is provided with a mouth portion 12 which is formed by a recess in the front portion of the body. This recess has smoothly curved walls 14 for the proper direction of water during the use of the present invention. An eye member 16 is supplied in the base of the recess and it is utilized for the purpose of attaching a fish line thereto, as is usual.

At the rear portion of the said body 10 there is provided another eye 18 which maintains a conventional hook 20 thereon. Hooks 22 and 24, respectively, are also utilized in association with this invention and more particularly this form thereof. However, these hooks are maintained by improved means which may be seen best in Figures 5–7. There is supplied a housing 28 having small cage-like extensions 30 and 32 integral therewith. These extensions are provided with dome-shaped housings which have apertures therein for accommodating screws 34 or any other suitable fastening means.

A slot 36 is formed in the said housing for accommodation of the shank of one of the hooks 22 or 24. Of course, the hook is rotated slightly and placed within the slot 36. Also, within the housing 28 is a substantially U-shaped bend 38 which forms a portion of a shank 40 of a key. This shank 40 has an eye 42 at one end thereof which is adapted to encircle one of the screws 34 in order to maintain it in position. The opposite end of the shank 40 may be bent slightly as at 44 thereby forming a leader for the eye of the hook 24 and also for maintaining the hook within the U-shaped bend 38. This, of course, maintains each of the hooks 22 and 24 in detachable relation with the body 10.

As is readily apparent from an inspection of Figure 3, this form of the invention in configuration and structure is identical to that shown in Figure 1. However, it is utilized in an inverted position. By positioning several of the housings 28 with their association extensions on various body members any selected number of hooks may be utilized and hooks may be placed in proper position for balance.

Figure 9:
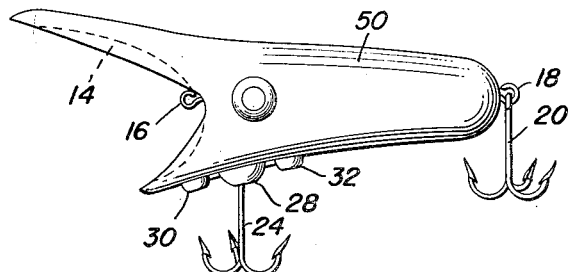
Figure 9 is a side view of the lure shown in Figure 8.
Figure 10:
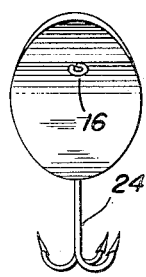
Figure 10 is a front view of a slightly modified form of lure using the invention.

Referring to Figure 9 it will be seen that another form of lure body 50 is illustrated, the differentiating feature being the specific shape of the body 50. Also, it is shown that the invention contemplates the use of merely one housing 28 with its extensions.

Figure 11:
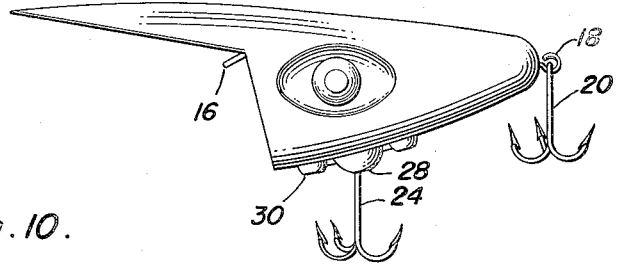
Figure 11 is a side view of the lure shown in Figure 10.

Viewing Figure 11 an obviously different type of fish lure is illustrated, particularly adapted for a specific type of fishing and, the specific means for maintaining the hook 24 in place is identical to the other fish lures described.

Figure 12:
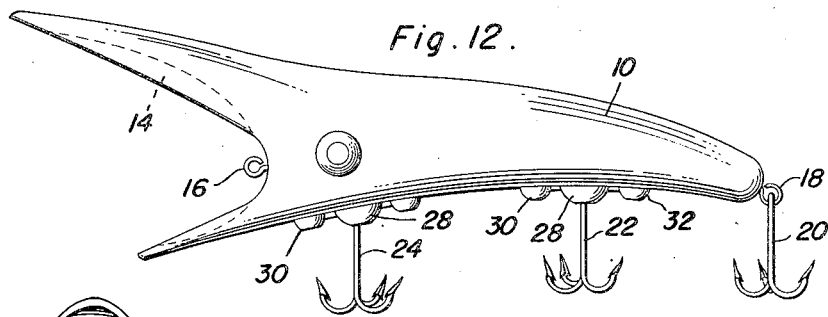
Figure 12 is a side view of another form of lure employing the invention.
Figure 13:
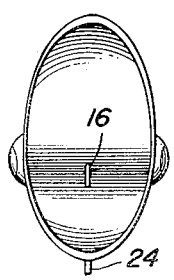
Figure 13 is a front view of the lure shown in Figure 12.

The embodiment of Figure 12 illustrates the use of hooks carried by assemblies shown in Figure 5, merely on the bottom portion of the lure, it being found that by utility of only a selected amount of hooks and by selection of location of the hooks on the lure different gesticulations may be realized in the utility of the invention.

While there has been described and illustrated but a preferred form of the invention and several uses thereof, it is apparent that variations may be made without departing from the spirit thereof. Accordingly, limitation is sought only in accordance with the scope of the following claim.

Having described the invention, what is claimed as new is:

A fish lure comprising a body, a hook, and means for detachably securing said hook to said body, said means including a dome-shaped slotted housing having extensions on opposite sides thereof, each of said extensions having dome-shaped housings on the outer end thereof, the latter housings having central openings, a key comprising a shank having an eye at one end and a U-shaped bend adjacent the other end and terminating in a free end, and screws extending through the openings into the body, one of the screws extending through the eye of the key, the U-shaped bend being positioned in alignment with the slot, and said hook having an eye pivoted on the bend and extending through the slot.

JOHN T. PEMBERTON.

REFERENCES CITED

The following references are of record in the file of this patent:

UNITED STATES PATENTS

| Number | Name | Date |
|---|---|---|
| 407,027 | Mosman | July 16, 1889 |
| 1,272,812 | Keister | July 16, 1918 |
| 1,483,842 | Carter II | Feb. 12, 1924 |
| 1,616,485 | Carter | Feb. 8, 1927 |
| 2,005,985 | Bear | June 25, 1935 |
| 2,378,370 | Van Buren | June 12, 1945 |